UNITED STATES PATENT OFFICE.

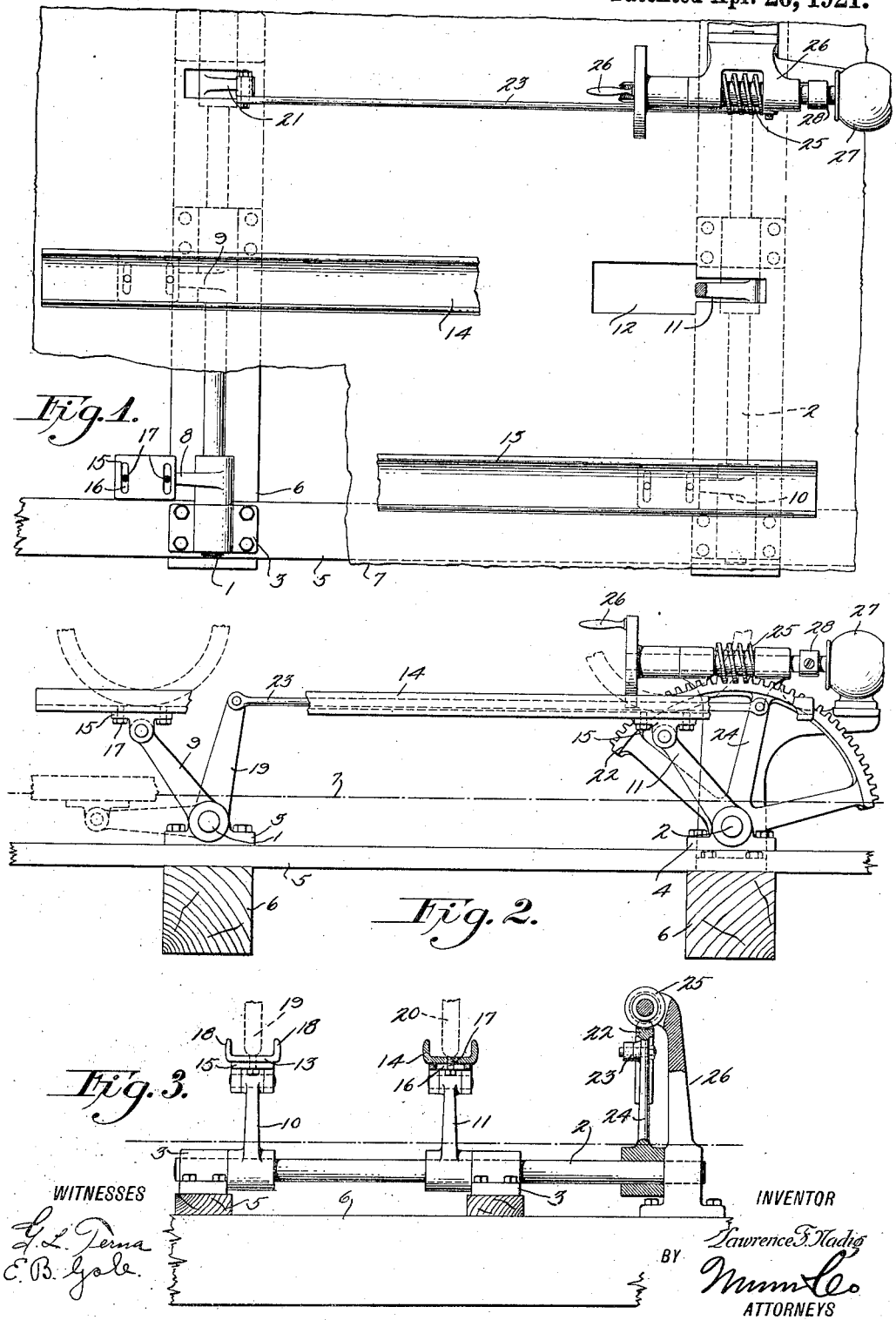

LAWRENCE F. NADIG, OF QUAKERTOWN, PENNSYLVANIA.

VEHICLE-LIFT.

1,376,157.  Specification of Letters Patent.  Patented Apr. 26, 1921.

Application filed February 25, 1920. Serial No. 361,099.

*To all whom it may concern:*

Be it known that I, LAWRENCE F. NADIG, a citizen of the United States, and resident of Quakertown, in the county of Bucks and State of Pennsylvania, have invented a new and Improved Vehicle-Lift, of which the following is a full, clear, and exact description.

This invention relates generally to a lifting device and is particularly adapted for lifting or raising automobiles or other vehicles, above the floor surface, in order to more readily have access to the lower and under portions of the vehicle for purposes of washing, cleaning, repairing, or other purposes.

Heretofore, in order to have access to the lower or under portion of a vehicle such for instance as an automobile, for any desired purpose, pits have been formed below the floor surface, and over which suitable tracks or runways for supporting the vehicles extend. Such a means, is undesirable in that the pits form pockets for accumulation of gases and oil, and so become dangerous and unhealthy places to work. Further, such pits are expensive and difficult to construct, and are poorly ventilated, afford insufficient light, and involve the loss of a certain amount of floor space.

One of the objects of this invention is to provide a device of simple and rugged construction to raise an automobile or other vehicle above the surface of the floor to permit access to the lower and under portion thereof, and this by a construction which will overcome the objections above noted.

A further object of this invention is to provide a lifting device for vehicles which may be readily installed to raise the said vehicle above the floor surface without requiring a substantial portion of the floor to be cut away. A device of this character may be operated manually or by power means.

A further object of this invention is to provide in a lifting device for vehicles a lifting mechanism including a worm and worm wheel whereby the load may be held in any desired raised position without the necessity for the use of an independent braking or holding means.

With the above and other objects in view, the invention consists in the construction arrangement and combination of parts hereinafter more fully described, and particularly pointed out in the appended claims.

In the accompanying drawings forming a part of this specification and showing for example one practical embodiment of the invention, similar characters of reference designate corresponding parts in the several views.

Figure 1 is a plan view with certain parts broken away, showing a device embodying the invention.

Fig. 2 is a side elevation view of Fig. 1, with certain parts broken away for purposes of clearance.

Fig. 3 is an end elevation view showing certain parts in section, representing a device embodying the invention, and showing a vehicle supported in an elevated position.

With reference to the accompanying drawings showing for example one practical embodiment of the invention, the device is there shown as comprising shafts 1—2 supported in suitable bearings 3—4 respectively upon planks 5 extending transversely of beams 6, the said construction being preferably arranged below the surface of a floor 7 or the like. Each of the shafts 1—2 is provided with a pair of arms 8—9 and 10—11 respectively, the said arms having a rigid connection with the respective shafts at one end, and being arranged so that the other end of the respective arms extend through suitable openings 12 in the floor. The shafts 1—2 are preferably arranged parallel with each other, and the arms are preferably so arranged on the respective shafts, that the arms on the respective shafts will be in alinement so that spaced tracks or runners 13—14 may be secured by a suitable pivotal connection to the upper ends of the arms. As shown in Fig. 1, the runner 13 is pivotally connected to the other end of the arms 8 and 10, and the runner 14 is secured by a suitable pivotal connection to the end of the arms 9—11. As a means of effecting a suitable connection, and in order to permit the distance between the tracks or runners 13—14 to be varied, a bracket 15 having slots 16 is pivotally carried in any suitable manner at the end of the arm, and bolts 17 extending through the slots 16 are shown connected with the runners. Thus, if it is desired to vary the distance between the tracks or runners 13—14, a bracket 15 having slots 16 is pivotally carried in any suitable manner at the end of the arm, and bolts 17 extending through the slots 16 are shown connected with the runners. Thus, if it is desired to vary the distance between the tracks or runners 13—14, it is only necessary to loosen the bolts 17, adjust the runners 13—14 to the proper position, and then tighten the bolts 17. The runners or tracks 13—14 may be of any suitable construction, but are preferably formed as U shaped channels having upstanding side portions 18, which serve as guides for the wheels 19 and 20 of a vehicle which may be placed thereon. Preferably, the runners are arranged to be substantially flush with the floor, in which position the arms 8—9 and 10—11 will occupy a position as shown in dotted lines in Fig. 2, substantially parallel with the floor surface.

In order to raise the runners 13—14 above the floor surface, a means is provided for simultaneously moving the shafts 1—2. For this purpose, another arm 21 is rigidly connected to one of the shafts as for instance 1, and a worm gear wheel segment 22 is connected in any suitable manner to the other shaft 2, and a connecting link member 23 is provided having a pivotal connection with the arm 21, and one of the arms 24 of the worm gear wheel 22. A worm 25 engaging the teeth of the worm gear wheel 22, is shown rotatably carried in a suitable supporting bracket 26. The worm may be manually operable by a handle 26 suitably arranged, or it may be power operated by a suitable prime mover 27 arranged preferably to drive the worm 25 through a coupling 28. It is here to be understood, that this invention is not to be limited to the particular arrangement of parts, and certain details as shown herein, but that the same may be varied to suit individual preference or conditions of use. It is to be noted that as the worm gear wheel 22 is driven, the shafts 1—2 are simultaneously rotated moving the arms 8—9 and 10—11 therewith, which in turn raises the runners 13 and 14 above the floor surface. The maximum distance that it is desired to raise the vehicle above the floor surface, will be governed by the length of the arms 8—9 and 10—11. Of course the vehicle may be raised and held at any height intermediate the limits of movement.

It is here to be noted that by providing a worm and worm gear wheel as a driving means, that additional or independent braking means are dispensed with for holding the runners with the vehicle thereon, in a given position. Thus it is seen that a worm functions as a brake for holding the load in a certain position.

It is further to be noted that by providing the spaced tracks or runners, that access may freely be had to the under portion of a vehicle mounted thereon for repair or other purposes, and further that free access may be had to the lower part of the vehicle for purposes of painting, cleaning and the like. It is to be noted that the floor space is maintained, and that no pit is required, thus enabling free circulation and good lighting facilities to be had. It is further to be noted that when the tracks or runners are in a lowered position, that the openings 12 for the arms are entirely covered.

While but one preferred form of the invention has herein been shown, it is to be understood that various changes and modifications may be made without departing from the spirit and scope of this invention.

Having thus described my invention, what I claim as new and desire to secure by Letters Patent, is:

1. A vehicle lift comprising a plurality of runners arranged in spaced relation on a floor, means for simultaneously raising the runners above the floor surface, whereby access may be had to the under side of the vehicle, the said means including a plurality of spaced shafts, the said shafts extending laterally of the runners, and arms connecting the said shafts and the runners, one end of said arms having a rigid connection with the shafts, the other end of said arms having a pivotal connection with the respective runners, means for rotating one of the shafts, said means including a worm and gear connection, whereby the vehicle may be held in any intermediate position between the limits of movement independent of other braking means.

2. In a vehicle lift the combination of spaced runners, a plurality of spaced shafts rotatably mounted, and extending transversely of the runners, means connecting the said runners and the shafts for effecting parallel movement of the runners in a vertical direction, the said means including a plurality of arms for each of the shafts, one end of each arm having a rigid connection with the shaft, one arm of each of the shafts being pivotally connected with one of the runners, and means connecting the said shafts for effecting simultaneous movement thereof, the said means including an arm rigid with one of the shafts, a worm wheel rigid with the other shaft, and a link member having a pivotal connection at its ends respectively with said last named arm and the worm wheel, a worm engaging the worm wheel, and a means for actuating the worm.

3. An automobile lift comprising parallel tracks, parallel shafts rotatably mounted and extending transversely of said tracks, means connecting said shafts and said tracks for effecting movement of the tracks, the said means including a pair of arms for one of the shafts, one end of said arms having a rigid connection with the shaft, the other end of said arms having a pivotal connection with the respective tracks, another pair of arms for the other shaft, one end of said last mentioned arms having a rigid connection with the shaft, the other end of said arms having a pivotal connection with the respective tracks, and means on one end of each of said arms and adjacent the tracks for varying the distance between the tracks without changing the position of the arms relative to the shafts.

4. In an automobile lift the combination of a track adapted to lie substantially flush with a floor surface, means for moving said track above the floor surface in parallel relation thereto, the said means including a plurality of parallel shafts rotatably mounted and arranged below the floor, and arms connecting the shafts and the said track, one end of each arm being rigid with a shaft, the other end of each arm having a pivotal connection with said track.

5. In an automobile lift the combination of a track adapted to lie substantially flush with a floor surface, means for moving said track above the floor surface in parallel relation thereto, the said means including a plurality of parallel shafts rotatably mounted and arranged below the floor, and arms connecting the shafts and the said track, one end of each arm being rigid with a shaft, the other end of said arm having a pivotal connection with said track, and means for moving the track axially of the shaft, the said means including an adjustable connection between the pivoted end of the arm and the track.

LAWRENCE F. NADIG.